United States Patent [19]
Wiselogel

[11] Patent Number: 5,570,244
[45] Date of Patent: Oct. 29, 1996

[54] METHOD AND APPARATUS FOR CONTROLLING ASSERTION OF A WRITE INHIBIT SIGNAL USING SEPARATE THRESHOLD VALUES FOR EACH OF A PLURALITY OF RECORDING SURFACES

[75] Inventor: Mark Wiselogel, Morgan Hill, Calif.

[73] Assignee: Conner Peripherals, Inc., San Jose, Calif.

[21] Appl. No.: 450,170

[22] Filed: May 25, 1995

[51] Int. Cl.⁶ .......................... G11B 15/04; G11B 19/04; G11B 5/127; G11B 5/33
[52] U.S. Cl. .......................... 360/60; 360/113; 360/77.02
[58] Field of Search .......................... 360/113, 60, 77.04, 360/78.07, 77.03, 77.05, 77.02, 75

[56] References Cited

U.S. PATENT DOCUMENTS

| | | | |
|---|---|---|---|
| 5,233,487 | 8/1993 | Christensen et al. | 360/77.04 |
| 5,270,880 | 12/1993 | Ottesen et al. | 360/60 |
| 5,434,733 | 7/1995 | Hesterman et al. | 360/113 |
| 5,521,772 | 5/1996 | Lee et al. | 360/75 |

*Primary Examiner*—Aristotelis Psitos
*Assistant Examiner*—Patrick Wamsley
*Attorney, Agent, or Firm*—Kinney & Lange, P.A.

[57] ABSTRACT

A method for controlling assertion of a write inhibit signal in a disk drive is described. The disk drive comprises at least one rotating disk having data recording surfaces, and a head for each recording surface. Each head is mounted by an actuator for selective positioning of the head over the respective disk surface. Each disk surface includes data tracks. The method comprises the steps of calculating and storing a write inhibit threshold value for each head in the disk drive, performing a track following operation to determine position of a preselected head relative to a preselected data track, retrieving the write inhibit threshold value for the preselected head, comparing the determined head position to the retrieved write inhibit threshold value and asserting a write inhibit signal upon a certain relationship between the determined head position and the retrieved write inhibit threshold value.

6 Claims, 4 Drawing Sheets

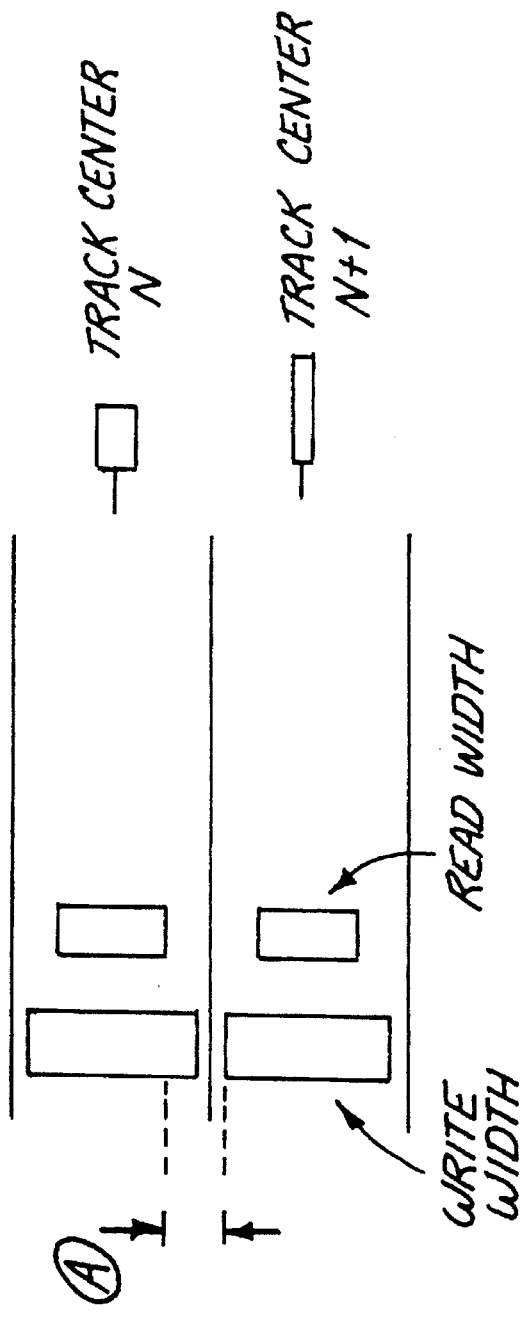

5,570,244

METHOD AND APPARATUS FOR CONTROLLING ASSERTION OF A WRITE INHIBIT SIGNAL USING SEPARATE THRESHOLD VALUES FOR EACH OF A PLURALITY OF RECORDING SURFACES

FIELD OF THE INVENTION

The present invention is directed to disk drives. More particularly, the present invention provides an adaptive write inhibit signal to reduce fallout due to servo off track conditions and decrease write inhibit events for improved disk drive performance. The write inhibit signal is separately controlled for each head/disk interface to optimize write operations as a function of head parameters unique to the head/disk interface.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided-into a series of data tracks that extend circumferentially around the disk. Each data track stores data in the form of magnetic transitions on the disk surface.

An interactive element, such as a magnetic transducer, is used to sense the magnetic transitions to read data, or to transmit an electric signal that causes a magnetic transition on the disk surface, to write data. Typically, the magnetic transducer is mounted in a head. The head, in turn, is mounted by a rotary actuator arm and is selectively positioned by the actuator arm over a preselected data track of the disk so that the transducer can either read data from or write data to the preselected data track of the disk, as the disk rotates below the transducer.

A gap is provided in the head to position the active elements of the transducer at a position suitable for interaction with the magnetic transitions. In certain modern transducer structures, dual gaps are provided in the head, one for positioning a read transducer and the other for positioning a write transducer. In this manner, separate technologies can be used for each of read and write transduction operations to enhance the overall effectiveness of a disk drive product. Moreover, the use of separate gaps accommodates design constraints that would preclude mounting different transduction technologies in the same physical gap.

For example, in a magnetoresistive head (MR head), a magnetoresistive element (MR element) is used as a read transducer. The magnetoresistive element comprises a material that exhibits a change in electrical resistance as a function of a change in magnetic flux of a magnetic field applied to the element. In a disk drive environment, the MR element is positioned within the read transducer gap, above a disk surface. In this position, the electrical resistance of the element changes in time as magnetic transitions recorded on the disk pass beneath the read gap, due to rotation of the disk. The changes in the resistance of the MR element caused by magnetic transitions on a disk occur far more quickly than the response of conventional transducers to magnetic transitions. Thus, an MR transducer is able to sense magnetic transitions during a read operation at higher rotational speeds and data densities.

However, an MR element is not able to transmit a signal in a manner that efficiently generates a magnetic field, which is necessary to write data on a disk surface. Accordingly, an inductive circuit is used as the write transducer and is positioned in the separate write gap.

Whenever data is either written to or read from a data track, the appropriate transducer gap is centered by the actuator arm over the centerline of the data track where the data is to be written or from where the data is to be read, to assure accurate transduction of the data. Thus, in a read operation, the gap associated with the MR element is centered over the appropriate data track centerline and the gap associated with the inductive write circuit will be offset from that track centerline due to a skew angle effect between the gaps. The opposite is true in a write operation.

An important aspect of conventional disk drive design relates to position control of the heads. The position control is used to accurately position a head over a data track for data read or write operations. As noted above, whenever data are either written to or read from a particular data track, the appropriate transducer gap of the corresponding head is preferably centered over the centerline of the magnetic transitions of the data track where the data are to be written or from where the data are to be read, to assure accurate transduction of the transitions representing data. If the head is off-center, the head may transduce transitions from an adjacent track.

A servo system is typically used to control the position of the actuator arm to insure that the head is properly positioned over the magnetic transitions during either a read or write operation. In a known servo system, servo position information is recorded on the disk surface itself, and periodically read by the head for use in a track following operation to control the position of the actuator arm. Such a servo arrangement is referred to as an embedded servo system. In modern disk drive architectures utilizing an embedded servo, each data track is divided into a number of data sectors for storing fixed sized data blocks, one per sector. In addition, associated with the data sectors are a series of servo sectors that are generally equally spaced around the circumference of the data track. The servo sectors can be arranged between data sectors or arranged independently of the data sectors such that the servo sectors split data fields of the data sectors, as is well known.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a control device such as a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to perform the track following operation. The track following operation basically entails the subtraction of one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

A write inhibit signal is used to terminate transmission of a write signal to a head during a time period that the servo signal indicates that the head is off center by an amount that would result in writing data in an adjacent track. In conventional disk drives, the threshold for asserting a write inhibit signal is set at the same level for all heads in the disk drive and at a level that is sufficient to accommodate the widest possible write gap width, relative to the width tolerances for the head. This is, in effect, a worst case solution. If the servo system indicates that the head is off track center by an amount that would cause a head, having a widest possible write gap,-to overwrite an adjacent data track, the write inhibit signal is asserted. This is true even if the actual width of the particular head is less than the maximum width, and would not, in fact, overwrite an adjacent data track. Indeed, this is true even if the write gap width is at the minimum end of the tolerance range. Accordingly, the write inhibit signal can be asserted more times than necessary to avoid overwriting adjacent data tracks, resulting in an undue disruption of disk drive operation.

In a dual gap head, the width dimension of the write transducer is typically approximately equal to the radial width of the data track, while the width dimension of the MR transducer is significantly narrower than the width of the write transducer. Advantage can be taken of the relatively narrow MR transducer in connection with servo position control relating to write operations. More specifically, the narrower width of the MR transducer permits greater leeway in setting the level of a write inhibit threshold. A properly positioned MR transducer will be well within the radial width of a data track when used in a read operation and will not read any transitions at the outer portions of the data track. Thus, a head positioned to write data to a particular data track can be displaced from that track centerline, even to the extent that it overlies an adjacent data track, if the amount the head overlies the adjacent data track is beyond the effective read width of the corresponding MR head when that head is properly positioned to read data from the adjacent data track.

However, the write inhibit threshold is still set relative to the widest possible write gap width and widest possible read gap width, and the same threshold is used for all of the heads of the disk drive. Accordingly, despite the added leeway available in disk drives utilizing MR heads, the number of write inhibit signal assertions will still generally exceed the number of assertions actually necessary to protect the integrity of data written onto data tracks.

SUMMARY OF THE INVENTION

The present invention provides an adaptive control for a write inhibit signal to decrease the number of times the write inhibit signal is asserted, and thereby improve disk drive performance. According to the present invention, a separate write inhibit threshold is set for each head/disk interface in the disk drive. In disk drives utilizing MR heads, the write inhibit threshold for any particular head/disk interface is set as a function of the actual width dimensions of each of the write and read gaps.

It is customary to measure the width of each of the write and read gaps for each head used in a disk drive. Thus, the information for implementing the present invention is ordinarily already available. A write inhibit threshold can be calculated for each head, based upon the actual dimensions for each head, and stored in a disk drive memory. During a write operation, the servo control system of the disk drive can retrieve the stored threshold value for the actual head being used in the write operation, and use that threshold value in the control of the assertion of the write inhibit signal.

The narrower the read gap of a particular head, the further the corresponding write gap can go off center during a write operation before reaching a portion of an adjacent track where the read gap would transduce transitions when reading data. This is also true for a write gap having a width dimension that is less than the maximum of the tolerance range for the head product. In such circumstances, the write inhibit threshold can be set at higher levels than necessary for a widest possible gap width case, to thereby take full advantage of lower dimensions for an actual head. According to the present invention, a write inhibit signal is asserted only if the actual dimensions of a particular head require its assertion to avoid writing within the read gap expanse of an adjacent track Thus in each instance, the number of times a write inhibit signal is asserted is controlled according to a best-as-can-be scenario for the particular head instead of a worst case scenario to minimize disruptions of disk drive write operations.

BRIEF DESCRIPTION OF THE DRAWINGS

FIG. 4 is a diagram of two adjacent data tracks illustrating the teachings of the present invention..

DETAILED DESCRIPTION

Figure 1:
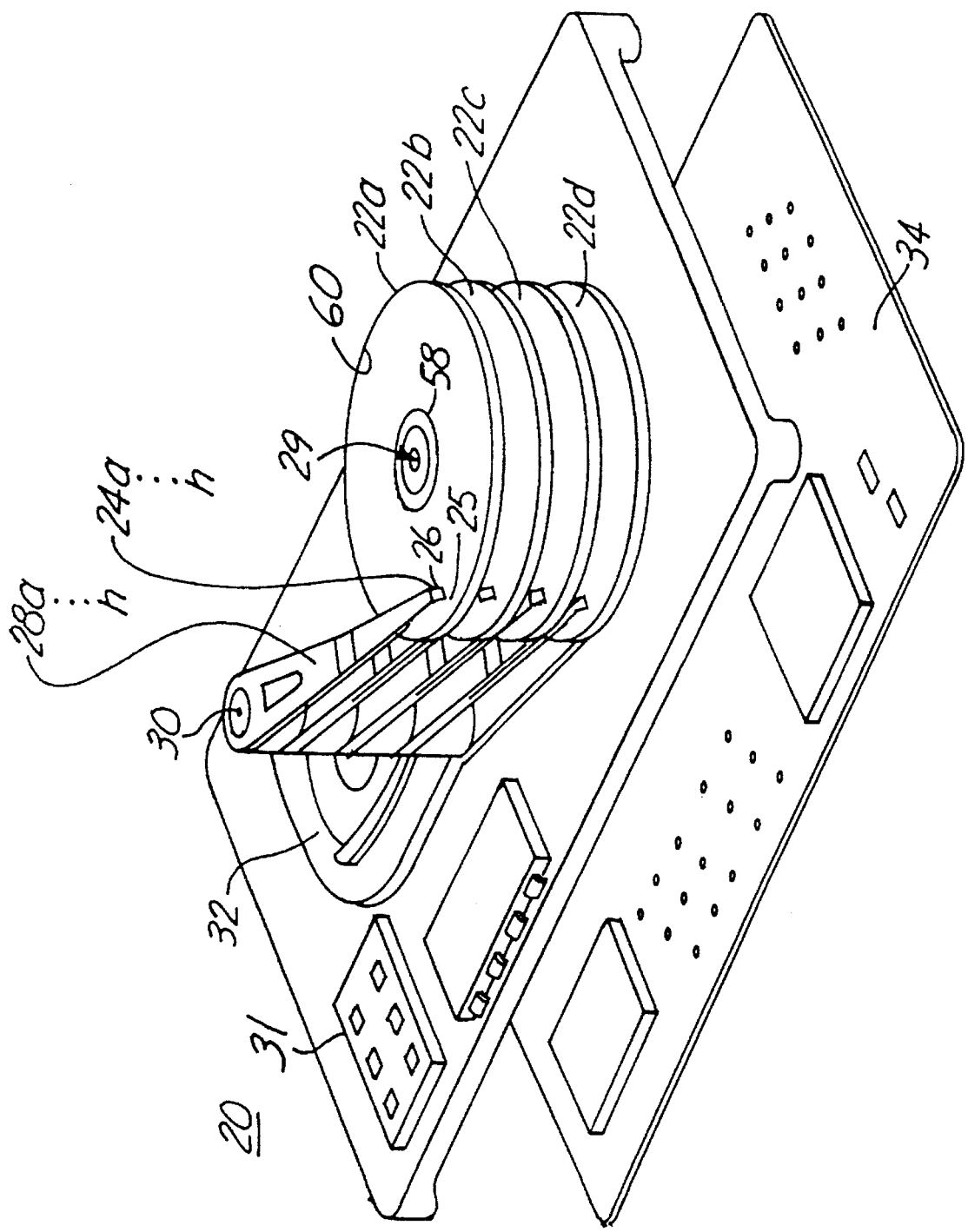
FIG. 1 is perspective view of an exemplary disk drive.

Referring now to the drawings, and initially to FIG. 1, there is illustrated an example of a disk drive designated generally by the reference numeral 20. The disk drive 20 includes a stack of storage disks 22a–d and a corresponding stack of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. To that end, a pre-amplifier 31 is mounted adjacent the voice coil motor 32 to electrically couple the heads 24a–h to the read/write channel circuitry. The pre-amplifier 31 includes an amplification stage to amplify electrical signals transduced by a head during a read operation, and a write driver arrangement to transmit a current to a head in a write operation. The manner for coupling the PCB 34 to the various components of the disk drive is well known in the art.

Figure 2:
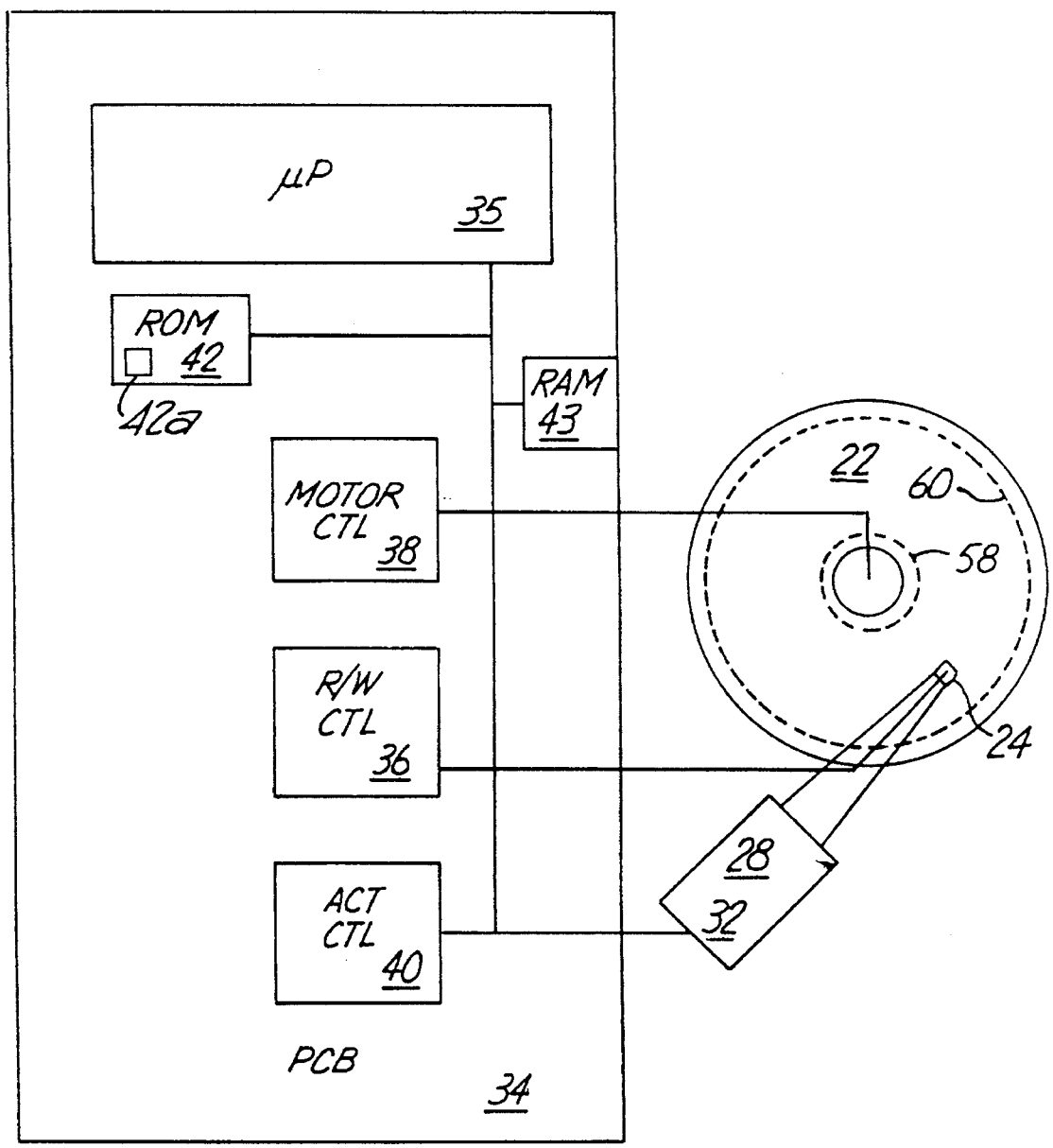
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A control device such as a microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position. Microprocessor instructions for a seek operation are stored in the ROM 42.

When the actuator has moved the read/write heads 24a–h to the destination data track, the pre-amplifier 31 is used to couple the head 24a–h over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are amplified by the pre-amplifier 31 and input to the read channel of the read/write control 36 for processing. The RAM 43 can be used to buffer data read from or to be written to the data sectors of the storage disks 22a–d via the read/write control 36. The buffered data can be transferred to or from a host computer utilizing the disk drive for data storage.

Figure 3A:
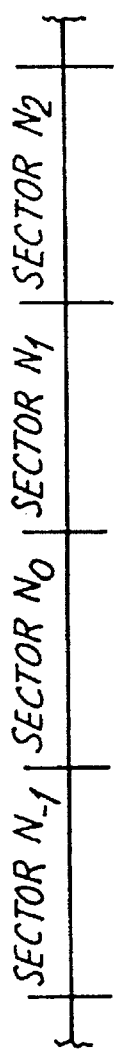
FIGS. 3a–c present a diagrammatic explosion of the format and constituency of a representative data sector, as recorded within the data tracks of the disks of the disk drive of FIG. 1.
Figure 3B:
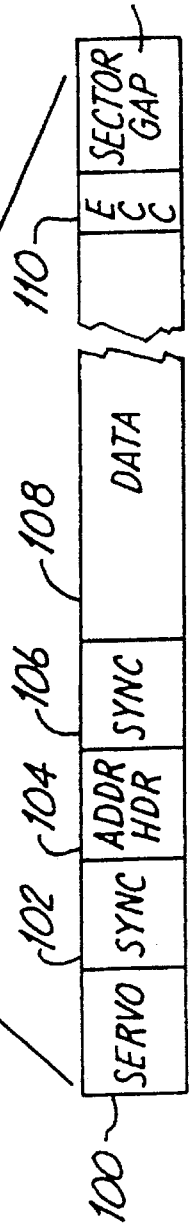
Figure 3C:
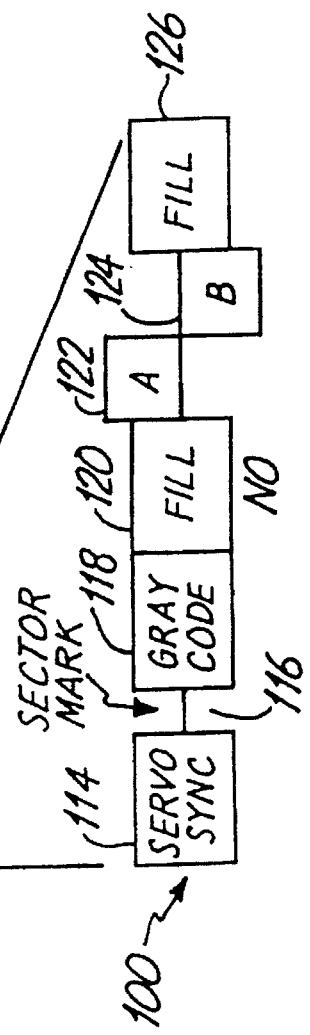

Referring now to FIGS. 3a–c, there is illustrated an exploded diagram showing the format and constituency of a representative data sector of one of the data tracks of the disks 22a–d, as used in a prior art, conventional disk drive. FIG. 3a represents a portion of a sequence of data sectors recorded in the form of magnetic-transitions within the radial extent of the data track. The data sectors are labeled $N_{-1}$, $N_0$, $N_1$ and $N_2$. The sequence of data sectors extends around the entire circumferential length of the data track.

FIG. 3b is an exploded view of the data sector $N_0$. The data sector $N_0$ is divided into a number of fields. The left most field comprises a servo field 100 that contains servo position information, as will be described in more detail in respect of FIG. 3c. The servo field 100 is followed by a sync field 102 containing recorded magnetic transitions that are used to synchronize the read and write electronics of the read/write control 36 to the frequency of magnetic transitions recorded on the disk surface in the following field.

Following the sync field 102 is an address header field 104 that contains magnetic transitions representing unique identification information for the specific data stored in the data sector $N_0$. In this manner, the disk drive system can locate and verify the exact data sector for any particular block of data that a host computer may require in a read operation. Included in the address header field 104 is head identification information to specify which one of the heads 24a–h is actually active and transmitting signals to or from the pre-amplifier 31. Another sync field 106 follows the address header field 104.

Actual data are stored in the next data field 108, which is followed by an error correcting field 110. The error correcting field 110 includes magnetic transitions representing information that is redundant of the data recorded in the data field 108. The error correcting information is used by the read/write control 36 to detect and correct errors that may occur during a read operation, using known error correcting techniques. A sector gap 112 follows the error correcting field 110 to physically separate the data sector $N_0$ from the following data sector $N_1$.

Referring now to FIG. 3c, each servo field 100 comprises position information that is used to control the radial position of the actuator arms 28a–h, e.g., during a read operation. A servo sync field 114 is used to synchronize the read and write electronics of the read/write control 36 to the frequency of magnetic transitions representing position information within the servo field 100. A sector mark 116 is a recorded transition that is used by the read/write control electronics to determine the beginning of the data sector $N_0$. The read/write control electronics uses the sector mark 116 to time the beginning of processing of electric signals transduced by the head over data sector $N_0$.

A Gray code field 118 follows the sector mark 116. The Gray code field 118 contains coded information that indicates the track number where data sector $N_0$ is located. This information is used to locate a particular data sector during a seek operation, as described above, by providing a unique identification for each data track on the respective disk surface. The Gray code field 118 is followed by a fill field 120 to separate the Gray code from the remaining servo field information comprising a servo pattern including an A burst 122 and a B burst 124.

As illustrated in FIG. 3c, the A and B bursts are arranged to straddle the centerline of the data sector $N_0$, with the A burst 122 positioned above the centerline, as shown in the example of FIG. 3c, and the B burst 124 positioned below the centerline. Each of the A and B bursts comprises a series of magnetic transitions of alternating north/south, south/north magnetic pole transitions which result in a series of electrical signals, when the transitions of the A and B bursts of the data sector $N_0$ are transduced by a corresponding head 24a–h, as the disk rotates.

The width of the head 24 a–h positioned above the data sector $N_0$ is approximately equal to the radial extent or width of the sector. As discussed, during a read or write operation, the head 24a–h is centered over the sector $N_0$ to properly transduce only magnetic transitions of the sector $N_0$ into corresponding electric signals. If the head 24a–h is off-center, the head 24a–h may begin to transduce transitions from data sectors of an adjacent track, resulting in an incorrect data read or write.

During operation of the disk drive, each time a head 24a–h is over a pair of A and B bursts, the signals transduced by the head 24a–h are transmitted to the microprocessor 35, which sums all of the signals from the A burst 122, sums all of the signals from the B burst 124, and subtracts one of the sum values from the other to obtain a subtraction result comprising a difference value, all according to instructions stored in the ROM 42. When the head 24a–h is properly position over the centerline, the difference value is zero. When the difference value is non-zero, that indicates that the head 24a–h is off-center For example, if the head 24a–h is completely off-center, above the centerline shown in FIG. 3c, the head 24c will transduce all of the transitions of the A burst 122, but none of the transitions of the B burst 124. The difference value will equal the sum of the transitions of the A burst 122 since the B burst sum will have a zero value. This result signals the microprocessor 35 to control the actuator arm 28a–h, via the actuator control 40, to move the head 24a–h toward the centerline, until the difference value is again zero.

In addition to instructions relating to seek and track following servo operations performed by the microprocessor 35, the ROM 42 stores instructions relating to a write inhibit signal. The microprocessor 35, during performance of servo track following functions in a write operation, will ascertain, during an indication of a non-zero difference value, whether the distance the head is displaced from a track centerline is above a certain threshold value. If it is, the microprocessor 35 asserts a write inhibit signal to suspend writing of data to the disk surface while the actuator arm is controlled to move the head back to a proper position. The threshold value is based upon the width of the write gap relative to track width. So long as the head writes to a data track and does not write to a region of an adjacent data track that is read by a head during a read operation to the adjacent data track, the head can continue to write, even though the servo information processed by the microprocessor 35 indicates a non-zero difference. The threshold value is a measurement of how far a head can be displaced from a track centerline before it does overlay a region of an adjacent track that is read. The use of a write inhibit signal minimizes disruptions to a write operation by permitting a continuation of the writing of data during off center conditions that do not impact data integrity.

As discussed above, in a conventional disk drive, the threshold value is set at a level that relates to the widest possible width for a write gap. In the manufacture of any product there is a tolerance range. The actual width of the write gap of a particular head in a disk drive will be within the tolerance range observed by the head manufacturer. The setting of the write inhibit threshold at the widest end of the tolerance range assures that the write inhibit signal is always properly asserted since it terminates a write operation at an amount of head displacement where the widest possible write gap would overlay a read region of an adjacent track. Heads having a narrower write gap width could actually be further displaced before affecting data integrity. However, this is the shortcoming of the conventional approach. When the actual width dimension of a head is less than the maximum of the tolerance range, the write inhibit signal is asserted more often than necessary to assure data integrity, resulting in an undue number of disruptions of write operations.

As noted above, an MR head has the added advantage of having a read gap that is much narrower than the write gap. Thus, in disk drives implementing MR heads, the write threshold can be set a higher level since a relatively wide outer region of each track is not within the read width of the track. The amount of the outer track region beyond the read gap width also varies from head to head, and can affect the write inhibit threshold. Indeed, the current manufacturing tolerance range for MR read gap width is as high as 40%.

However, when following the conventional write inhibit approach, advantage is not taken of read and write gap widths that are less than the maximum of the tolerance range.

According to the present invention, an adaptive control is provided for the write inhibit signal. In an exemplary embodiment of the invention, a write inhibit threshold table 42a is stored in the ROM 42. The table lists a write inhibit threshold value for each individual head of the disk drive. The value stored for a particular head is based upon actual measurements of the read and write gaps of that head. When a write operation is to be performed, the microprocessor 35 looks up the threshold value for the specific head to be used in the write operation and uses that value to control assertion of the write inhibit signal during the write operation.

FIG. 4 can be used to explain the adaptive control features according to the present invention, when used with MR heads. Tracks N and N+1 are two adjacent data tracks. The blocks shown in Tracks N and N+1 marked illustrate the positions of the write width and read width, from left to right respectively, of a head having separate write and read gaps, when centered over the tracks. The distance A represents the distance a head can go off center from a track during a write operation without affecting the portion of the adjacent data track traversed by a read gap during a read at the adjacent track. In other words, if during a write to Track N+1, the head moves off center with respect to Track N+1, towards Track N, any transitions falling within the radial extent of Track N will not affect data integrity so long as the transitions are outside of the radial extent of the read width of Track N.

A write inhibit signal would only have to be asserted when the displacement of the head is great enough to overlay the read width of the adjacent track. The present invention recognizes that the actual dimensions for read and write gaps vary form head to head. Accordingly, a write inhibit threshold is calculated and stored for each individual head in the disk drive. The write inhibit threshold for any particular head is calculated as a function of the actual dimensions of the head.

The following is a simplified example according to the present invention, in pseudo code, for the track following and write inhibit operation of a disk drive when the disk drive is writing to a preselected data track:

1. begin track following
2. measure each burst value at a servo sector
3. calculate a difference value between the servo burst values
4. if the difference value is zero go to 2, if not:
   i. retrieve write inhibit threshold from table 42a for the head being used to write
   ii. compare difference value to threshold value
      if difference value is greater than threshold assert write inhibit signal, then go to 5
      if difference value is less than threshold go to 5
5. calculate and transmit control signal for moving the head

What is claimed is:

1. A method for controlling assertion of a write inhibit signal in a disk drive having at least two rotatable disk data recording surfaces, and a head for each recording surface, each head being mounted by an actuator for selective positioning of the head over the respective disk surface, each disk surface including data tracks, the method comprising the steps of:

storing a plurality of write inhibit threshold values and assigning at least one of the write inhibit threshold values to each head in the disk drive;

performing a track following operation to determine position of a preselected head relative to a preselected data track;

retrieving a write inhibit threshold value for the preselected head;

comparing the determined head position to the retrieved write inhibit threshold value; and asserting a write inhibit signal upon a predetermined relationship between the determined head position and the retrieved write inhibit threshold value.

2. The method of claim 1 wherein each head includes a read gap and a write gap, each write inhibit threshold value being a function of width dimensions of the read gap and write gap of the respective head.

3. The method of claim 2 wherein the read gap includes an MR element and is smaller than the write gap.

4. A disk drive comprising:

at least two disk data recording surfaces for storing information;

each data recording surface having a plurality of data tracks;

a set of interactive elements, one per disk surface, each interactive element being used to read information from and write information to data tracks of a respective one of the disk surfaces;

a control device for performing control functions in the disk drive including a track following operation; and a memory having a write inhibit threshold value table;

the write inhibit threshold value table storing a write inhibit threshold value for each interactive element in the disk drive;

the control device operating during a track following operation to determine position of a preselected interactive element relative to a preselected data track, retrieve the write inhibit threshold value for the preselected interactive element from the write inhibit threshold value table and compare the determined interactive element position to the retrieved write inhibit threshold value, and assert a write inhibit signal upon a predetermined relationship between the determined interactive element position and the retrieved write inhibit threshold value.

5. The apparatus of claim 4 wherein each head includes a read gap and a write gap, each write inhibit threshold value being a function of width dimensions of the read gap and write gap of the respective head.

6. The apparatus of claim 5 wherein the read gap includes an MR element and is smaller than the write gap.

* * * * *